United States Patent
Kim

(10) Patent No.: US 9,852,527 B2
(45) Date of Patent: Dec. 26, 2017

(54) APPARATUS AND METHOD FOR DENOISING CT IMAGES

(71) Applicant: SNU R&DB FOUNDATION, Seoul (KR)

(72) Inventor: Jong Hyo Kim, Seoul (KR)

(73) Assignee: SNU R&DB FOUNDATION, Seoul (KR)

(*) Notice: Subject to any disclaimer, the term of this patent is extended or adjusted under 35 U.S.C. 154(b) by 130 days.

(21) Appl. No.: 15/143,937

(22) Filed: May 2, 2016

(65) Prior Publication Data

US 2017/0084058 A1 Mar. 23, 2017

(30) Foreign Application Priority Data

Jul. 23, 2015 (KR) .................. 10-2015-0104212

(51) Int. Cl.
| | | |
|---|---|---|
| *G06K 9/00* | (2006.01) | |
| *G06T 11/00* | (2006.01) | |
| *G06T 5/00* | (2006.01) | |

(52) U.S. Cl.
CPC .......... *G06T 11/006* (2013.01); *G06T 5/002* (2013.01); *G06T 2207/10081* (2013.01); *G06T 2207/20048* (2013.01)

(58) Field of Classification Search
CPC .......... G06T 5/002; G06T 2207/10081; A61B 6/032; A61B 6/5258; G01N 2223/419; G01N 23/046; Y10S 378/901
See application file for complete search history.

(56) References Cited

U.S. PATENT DOCUMENTS

| | | | | |
|---|---|---|---|---|
| 7,187,794 B2* | 3/2007 | Liang | .................. | G06T 5/10 378/4 |
| 2011/0286651 A1* | 11/2011 | Yu | .................. | G06T 11/005 382/131 |
| 2013/0051674 A1* | 2/2013 | Goossens | .................. | G06T 5/002 382/173 |
| 2013/0202079 A1* | 8/2013 | Yu | .................. | A61B 6/5258 378/19 |
| 2013/0202178 A1* | 8/2013 | Shechter | .................. | A61B 6/032 382/131 |
| 2015/0379694 A1* | 12/2015 | Goshen | .................. | A61B 6/032 382/195 |

FOREIGN PATENT DOCUMENTS

KR 20140130784 11/2014

OTHER PUBLICATIONS

Wang J, Li T, Lu H, Liang Z. Penalized weighted least-squares approach to sinogram noise reduction and image reconstruction for low-dose x-ray computed tomography. 2006. IEEE Trans Med Imaging. 25(10):1272-1283.*

* cited by examiner

*Primary Examiner* — Bhavesh Mehta
*Assistant Examiner* — Ian Lemieux
(74) *Attorney, Agent, or Firm* — Cantor Colburn LLP

(57) ABSTRACT

Provided is a denoising method including: generating a synthetic sinogram from an input original CT image; acquiring a noise component from the generated synthetic sinogram; generating a noise component CT image based on the noise component; and reducing noise in the original CT image based on the noise component CT image.

20 Claims, 9 Drawing Sheets

APPARATUS AND METHOD FOR DENOISING CT IMAGES

CROSS-REFERENCE TO RELATED APPLICATION

This application claims the benefit of Korean Patent Application No. 2015-0104212 filed on Jul. 23, 2015, the disclosures of which are incorporated herein by reference.

TECHNICAL FIELD

The present disclosure relates to an apparatus and method for denoising CT images.

BACKGROUND

Computed tomography (CT) scan produces cross-sectional images of the body lying in a cylinder-shaped large machine equipped with an X-ray generator, and enables a user to more clearly see structures and lesions due to less overlap of structures than a regular X-ray. Therefore, CT scans have been widely used for examination of most of organs and diseases.

Sufficient image quality (resolution or precision) is very important for an accurate diagnose of the disease with CT scans. Along with the advancement of the CT hardware technologies, much efforts are underway to improve the quality of CT images. Examples of the efforts may include the multi-channel detector technology and high-speed high-resolution imaging technology. Usually, the efforts to improve a quality of a CT image involve high-dose radiation exposure and thus may cause an increased cancer risk to patients. Particularly, considering the recent public awareness of radiation exposure, the efforts to acquire a high-quality diagnostic image need to be accompanied by efforts to minimize the radiation dose.

In an effort to do so, CT scanner manufacturers have released iterative reconstruction CT systems which enable to produce noise-reduced CT images at lower radiation dose. However, it is often not easy to afford the iterative reconstruction CT systems due to higher expenses than conventional products and difficulty in disposal of the conventional products. The CT scanner manufacturers sometimes offer an upgrade program to convert the legacy CT systems into in the iterative reconstruction CT systems. However, those upgrade programs are not applicable to all legacy CT systems due to technical problems and high cost. The present invention was devised to provide a solution to these problems. A background technology of the present invention is disclosed in Korean Patent Laid-open Publication No. 10-2014-0130784.

SUMMARY

In view of the foregoing, the present disclosure provides an apparatus and method for denoising a CT image, capable of producing a high-quality denoised CT image from a noisy low-dose CT image. Herein, the denoised CT image provide high image quality comparable to that of a regular-dose CT image.

Further, the present disclosure provides an apparatus and method for denoising a CT image, capable of generating a synthetic sinogram from an input low-dose CT image and acquiring a noise component image from the generated synthetic sinogram.

Furthermore, the present disclosure provides an apparatus and method for denoising a CT image, capable of acquiring a noise component CT image by applying the filtered back-projection operation to the noise component sinogram from the generated synthetic sinogram and generating a denoised CT image by using the acquired noise component CT image.

However, problems to be solved by the present disclosure are not limited to the above-described problems. The present disclosure can be applied to solve other problems, too.

According to an exemplary embodiment, there is provided a denoising method including: generating a synthetic sinogram from an input original CT image; acquiring a noise component synthetic sinogram from the generated synthetic sinogram; generating a noise component CT image based on the noise component synthetic sinogram; and reducing noise in the original CT image based on the noise component CT image.

According to an example of the present exemplary embodiment, the synthetic sinogram generation procedure includes: determining the attenuation coefficient of each pixel in original CT image; obtaining the CT geometry data such as X-ray source to detector distance and X-ray source to patient distance.

According to an example of the present exemplary embodiment, the synthetic sinogram generation procedure includes: determining the attenuation coefficient of each pixel in original CT image; obtaining the CT geometry data such as X-ray source to detector distance and X-ray source to patient distance based on DICOM header of the original CT image; generating the synthetic sinogram based on the said determined attenuation coefficient of each pixel along with the CT geometry data such as X-ray source to detector distance and X-ray source to patient distance.

According to an example of the present exemplary embodiment, the synthetic sinogram may be generated by performing the projection operation at each rotation angle based on the determined attenuation coefficient of each pixel along with the CT geometry data such as X-ray source to detector distance and X-ray source to patient distance.

According to an example of the present exemplary embodiment, acquiring the noise component synthetic sinogram from the generated synthetic sinogram includes: acquiring a first noise component synthetic sinogram by extracting a noise component from the synthetic sinogram; extracting a structural component from the first noise component synthetic sinogram; and generating a second noise component synthetic sinogram from the first noise component synthetic sinogram by subtracting the extracted structural component in the first noise component synthetic sinogram.

According to an example of the present exemplary embodiment, acquiring the noise component synthetic sinogram includes: extracting a noise component using at least one of multiple methods. The multiple methods may include: a first method in which a filter kernel is determined in the synthetic sinogram according to a predetermined rule and a noise component is extracted based on the kernel; a second method in which a noise component is extracted based on the 2D. Fourier transform; a third method in which a noise component is extracted based on the 2D. Wavelet transform; and a fourth method in which a noise component is extracted based on eigen decomposition of Hessian matrix at each pixel.

According to an example of the present exemplary embodiment, generating the noise component CT image based on the noise component synthetic sinogram may include generating the noise component CT image by applying the filtered back-projection operation to the noise component synthetic sinogram.

According to an example of the present exemplary embodiment, generating the noise component CT image may include: generating a first noise component CT image by applying the filtered back-projection operation to the noise component synthetic sinogram; extracting the structural component from the first noise component CT image; and generating a second noise component CT image from the first noise component CT image by reducing the extracted structural component in the first noise component CT image.

According to an example of the present exemplary embodiment, reducing noise in the original CT image may be reducing noise in the original CT image based on the noise component CT image.

According to an example of the present exemplary embodiment, reducing noise in the original CT image may include: extracting tissue information from the original CT image; and substracting noise in the original CT image based on the extracted tissue information.

According to an example of the present exemplary embodiment, reducing noise in the original CT image may include decreasing noise in the original CT image by adaptively subtracting the noise component CT image from the original CT image based on the extracted tissue information.

According to an example of the present exemplary embodiment, extracting the structural component from the noise component synthetic sinogram or the noise component CT image may include extracting the structural direction and signal coherence at each pixel in the noise component synthetic sinogram or the noise component CT image.

According to an example of the present exemplary embodiment, the structural direction of each pixel may be a perpendicular direction of a normalized gradient vector, and the signal coherence may be determined based on the combination of an absolute gradient of a normalized gradient vector and an absolute gradient of a perpendicular vector to the normalized gradient vector.

According to an example of the present exemplary embodiment, the structural direction of each pixel may be a second eigen vector in Hessian matrix of each pixel, and the signal coherence may be determined based on a combination of the two absolute eigen values in Hessian matrix of each pixel.

According to an example of the present exemplary embodiment, the structural direction and the signal coherence may be determined based on the ratio of an absolute gradient to an absolute first eigen value in Hessian matrix of each pixel: when the ratio is greater than a predetermined reference value, the structural direction may be a perpendicular direction of the normalized gradient vector, and the signal coherence may be determined based on the combination of an absolute gradient of the normalized gradient vector and an absolute gradient of a perpendicular vector of the normalized gradient vector; when the ratio is smaller than the predetermined reference value, the structural direction may be a second eigen vector in Hessian matrix and the signal coherence may be determined based on the combination of two absolute eigen values in Hessian matrix.

According to an example of the present exemplary embodiment, extracting the structural component from the noise component synthetic sinogram or the noise component CT image based on the structural direction and the signal coherence may include: determining a kernel corresponding to a 2D anisotropic Gaussian function reflecting the structural direction and the signal coherence; and performing image filtering with the kernel for the noise component synthetic sinogram or the noise component CT image.

According to an example of the present exemplary embodiment, the major axis length of 2D anisotropic Gaussian function may be a predetermined value, and the minor axis may be determined by multiplying the major axis length by the signal coherence and a predetermined proportional constant. The rotation angle of 2D anisotropic Gaussian function may be the structural direction.

According to another exemplary embodiment, there is provided a denoising apparatus including: a synthetic sinogram generation unit configured to generate a synthetic sinogram from an input original CT image; a noise component acquisition unit configured to acquire a noise component synthetic sinogram from the generated synthetic sinogram; a noise component CT image generation unit configured to generate a noise component CT image based on the noise component synthetic sinogram; and a denoising unit configured to reduce noise in the original CT image based on the noise component CT image.

According to an example of the present exemplary embodiment, the noise component synthetic sinogram acquisition unit may acquire the noise component synthetic sinogram by extracting a noise component from the synthetic sinogram.

According to an example of the present exemplary embodiment, the noise component CT image generation unit may generate the noise component CT image by applying the filtered back-projection operation to the noise component synthetic sinogram.

According to an example of the present exemplary embodiment, the denoising unit may extract structural component from the original CT image and reduce noise in the original CT image based on the extracted structural component.

According to an example of the present exemplary embodiment, the denoising unit may reduce noise in the original CT image by adaptively subtracting the noise component CT image from the original CT image based on the extracted structural component.

The above-described exemplary embodiments are provided as an illustration only and should not be construed as liming the present disclosure. Besides the above-described exemplary embodiments, there may be additional exemplary embodiments described in the accompanying drawings and explanation.

According to the exemplary embodiments, it is possible to produce a high-quality denoised CT image from a noisy low-dose CT image. Herein, the denoised CT image may show high image quality comparable to that of a regular-dose CT image.

Further, according to the present disclosure, it is possible to generate a synthetic sinogram from an input low-dose CT image, and acquire a noise component sinogram from the generated synthetic sinogram.

Furthermore, according to the present disclosure, it is possible to generate a noise component CT image by applying the filtered back-projection operation to the noise component synthetic sinogram.

Moreover, according to the present disclosure, it is possible to produce a high-quality denoised CT image by reducing noise based on an original low-dose CT image and the noise component CT image.

Further, effects to be achieved by the present disclosure are not limited to the above-described effects. Although not described herein, other effects to be achieved by the present disclosure can be clearly understood by those skilled in the art from the following description.

BRIEF DESCRIPTION OF THE DRAWINGS

In the detailed description that follows, embodiments are described as illustrations only, since various changes and modifications will become apparent to those skilled in the art from the following detailed description. The use of the same reference numbers in different figures indicates similar or identical items.

REFERENCE CHARACTERS

Figure 1:
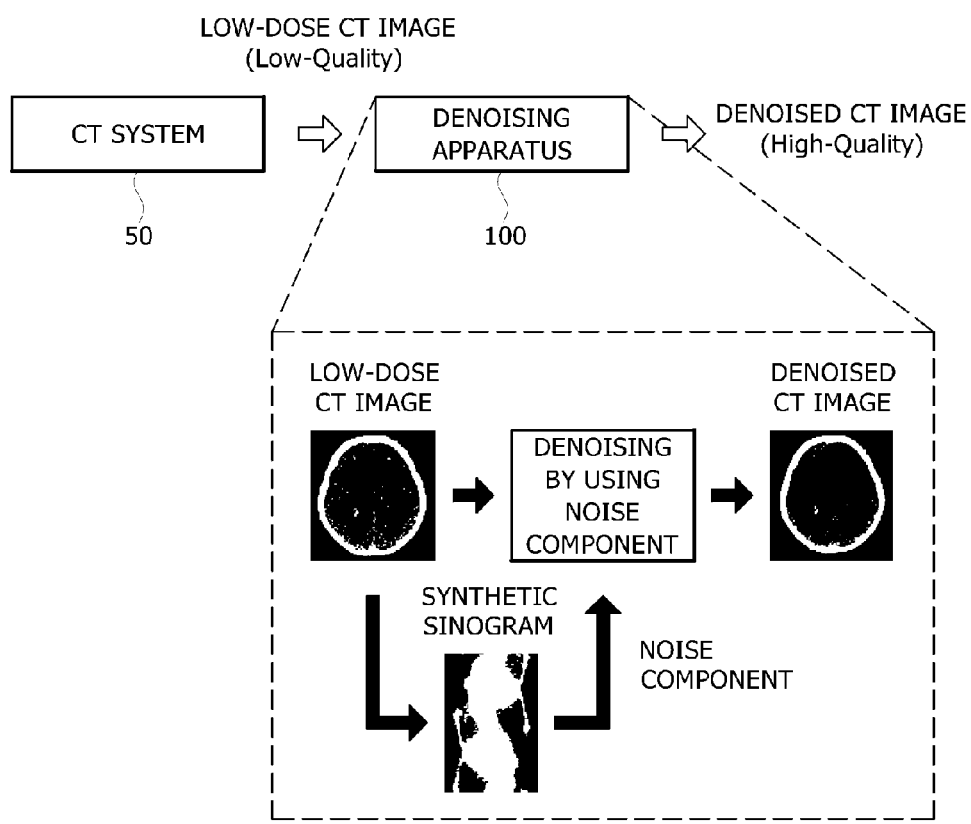
FIG. 1 is an overall conceptual diagram of the denoising apparatus according to an exemplary embodiment of the present disclosure.

100: Denoising apparatus
110: Synthetic sinogram generation unit
120: Noise component acquisition unit
130: Noise component CT image generation unit
140: Denoising unit

DETAILED DESCRIPTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Throughout the whole document, the term "connected to" or "coupled to" that is used to designate a connection or coupling of one element to another element includes both a case that an element is "directly connected or coupled to" another element and a case that an element is "electronically connected or coupled to" another element via still another element.

Throughout the whole document, the term "on" that is used to designate a position of one element with respect to another element includes both a case that the one element is adjacent to the another element and a case that any other element exists between these two elements.

Further, Throughout the whole document, the term "comprises or includes" and/or "comprising or including" used in the document means that one or more other components, steps, operation and/or existence or addition of elements are not excluded in addition to the described components, steps, operation and/or elements unless context dictates otherwise.

Throughout the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Throughout the whole document, the term "step of" does not mean "step for".

Throughout the whole document, the term "unit" includes a unit implemented by hardware, a unit implemented by software, and a unit implemented by both of them. One unit may be implemented by two or more pieces of hardware, and two or more units may be implemented by one piece of hardware.

Throughout the whole document, a part of an operation or function described as being carried out by a terminal, apparatus or device may be carried out by a server connected to the terminal, apparatus or device. Likewise, a part of an operation or function described as being carried out by a server may be carried out by a terminal, apparatus or device connected to the server. Hereinafter, exemplary embodiments of the present disclosure will be described in detail with reference to the accompanying drawings.

Each component illustrated in FIG. 1 can be connected to each other through a network. Herein, the network refers to a connection structure that enables information exchange between nodes such as multiple devices, servers, etc. Examples of the network may include a 3GPP (3rd Generation Partnership Project) network, an LTE (Long Term Evolution) network, a WIMAX (World Interoperability for Microwave Access) network, the Internet, a LAN (Local Area Network), a Wireless LAN (Wireless Local Area Network), a WAN (Wide Area Network), a PAN (Personal Area Network), a Bluetooth network, a satellite broadcasting network, an analog broadcasting network, a DMB (Digital Multimedia Broadcasting) network, and the like, but are not limited thereto.

FIG. 1 is an overall conceptual diagram of a denoising apparatus according to an exemplary embodiment of the present disclosure.

As illustrated in FIG. 1, the denoising apparatus 100 receives a low-dose CT image from a CT system 50 and generates a synthetic sinogram with projection operation based on the received CT image. Further, the denoising apparatus 100 extracts the noise component from the generated synthetic sinogram and reduces noise using the extracted noise component. Therefore, the denoising apparatus 100 can produce a denoised image. Herein, the synthetic sinogram may be expressed as a virtual sinogram.

The denoising apparatus 100 can produce a high-quality denoised CT image from an input of a low-dose CT image. Herein, the denoised CT image may show high image quality comparable to that of the regular-dose CT image.

Figure 2:
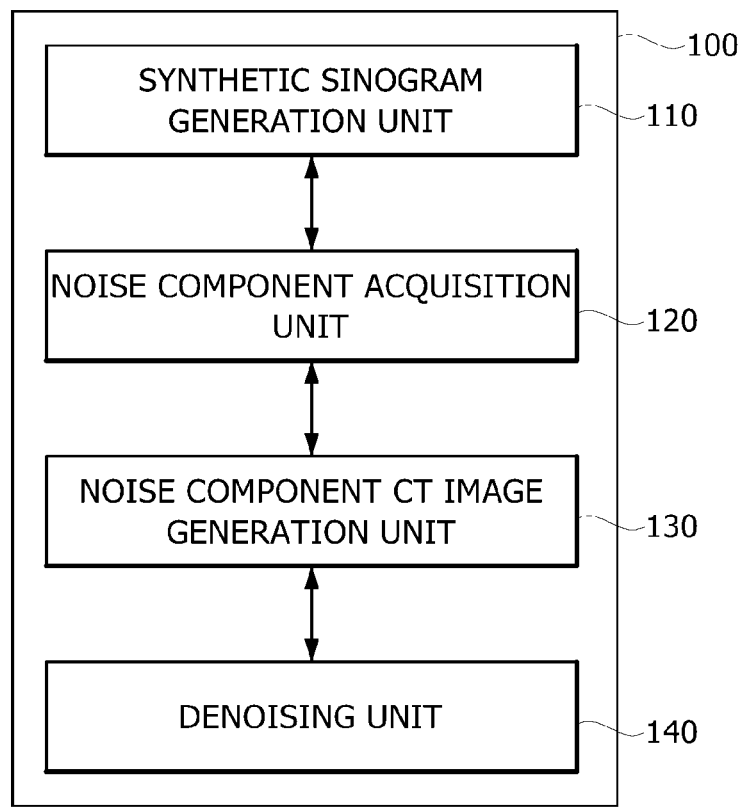
FIG. 2 is a diagram illustrating a configuration view of a denoising apparatus according to an exemplary embodiment of the present disclosure.

FIG. 2 is a diagram illustrating a configuration view of a denoising apparatus according to an exemplary embodiment of the present disclosure. Referring to FIG. 2, the denoising apparatus 100 includes a synthetic sinogram generation unit 110, a noise component acquisition unit 120, a noise component CT image generation unit 130, and a denoising unit 140. The denoising apparatus 100 is just one example of the present disclosure. Therefore, according to various exemplary embodiments of the present disclosure, the denoising apparatus 100 may be configured in a different manner from that illustrated in FIG. 1.

Hereinafter, each component of the denoising apparatus 100 will be described in detail with reference to FIG. 2.

The synthetic sinogram generation unit 110 may generate a synthetic sinogram from an input original CT image.

Further, the synthetic sinogram generation unit 110 may obtain tube voltage data along with CT geometry data such as X-ray source to detector distance and X-ray source to patient distance based on DICOM header in the original CT image, and determine the attenuation coefficient at each pixel in the original CT image, Herein, once tube voltage data of the original CT image is obtained, the synthetic sinogram generation unit 110 may determine an attenuation coefficient of each pixel using the relationship on CT number and attenuation coefficient for a given tube voltage.

Further, the synthetic sinogram generation unit 110 may generate a synthetic sinogram by performing a projection operation at each rotation angle based on the determined attenuation coefficient of each pixel along with the CT geometry data such as X-ray source to detector distance and X-ray source to patient distance.

The noise component acquisition unit 120 may acquire a noise component synthetic sinogram by extracting a noise component from the synthetic sinogram generated by the synthetic sinogram generation unit 110.

By way of example, the noise component acquisition unit 120 may generate a denoised and filtered synthetic sinogram by: determining the noise level at each pixel in the synthetic sinogram, extracting a structural direction and signal coherence at each pixel in the synthetic sinogram, performing an anisotropic-bilateral filtering based on the structural direction, signal coherence, and noise level, and subtracting the filtered synthetic sinogram from the synthetic sinogram.

By way of example, the noise component acquisition unit 120 may determine a filter kernel according to a predetermined rule and apply to the synthetic sinogram generated by the synthetic sinogram generation unit 110 and extract the noise component. Further, the noise component acquisition unit 120 may extract the noise component based on the 2D Fourier transform, or may extract the noise component based on the 2D Wavelet transform. Furthermore, the noise component acquisition unit 120 may extract the noise component based on eigen decomposition of Hessian matrix.

By way of example, the noise component acquisition unit 120 may determine a filter kernel according to a predetermined rule in order to make it easy to separate the noise component from the structural component by making use of the characteristic that noise components have greater local changes as compared with the structural components, and extract the noise component from the synthetic sinogram by filtering the synthetic sinogram with the said kernel.

By way of example, the noise component acquisition unit 120 may extract a noise component from the synthetic sinogram by making use of the characteristic that noise components are located at a relatively high-frequency band as compared to the structural components in a 2D Fourier transform domain. The 2D Fourier transform is applied to the synthetic sinogram, followed by multiplying a predetermined weight to a high-frequency band then performing the 2D inverse Fourier transform.

By way of example, the noise component acquisition unit 120 may extract a noise component from the synthetic sinogram by making use of the characteristic that the noise components are located at a relatively high-frequency band as compared to the structural components in a 2D Wavelet transform domain. The 2D Wavelet transform is applied to the synthetic sinogram, followed by multiplying a predetermined weight to high-frequency band and then performing the 2D inverse Wavelet transform.

Hessian matrix is a matrix of second-order partial derivatives with respect to vertical and horizontal directions of a pixel, and may be represented by Equation 5. When the Hessian matrix H[x,y] of a pixel (x,y) is decomposed into the first and second eigen components, the first eigen component may represent the structural component while the second eigen component may represent the noise component. Therefore, the noise component acquisition unit 120 may extract the noise component from a synthetic sinogram using the second eigen component of Hessian matrix of each pixel in the synthetic sinogram.

According to an exemplary embodiment of the present disclosure, the noise component acquisition unit 120 may acquire a first noise component synthetic sinogram by extracting a noise component from the synthetic sinogram generated by the synthetic sinogram generation unit 110 and extract a structural component from the first noise component synthetic sinogram. Further, the noise component acquisition unit 120 may generate a second noise component synthetic sinogram from the first noise component synthetic sinogram by reducing the extracted structural component in the first noise component synthetic sinogram.

The noise component CT image generation unit 130 may generate a noise component CT image based on the noise component synthetic sinogram acquired by the noise component acquisition unit 120.

To be specific, the noise component CT image generation unit 130 may generate a noise component CT image by applying the filtered back-projection operation to the noise component synthetic sinogram.

According to an exemplary embodiment of the present disclosure, the noise component CT image generation unit 130 may generate a first noise component CT image by applying the filtered back-projection operation to the noise component synthetic sinogram. Further, the noise component CT image generation unit 130 may extract a structural component from the first noise component CT image and generate a second noise component CT image from the first noise component CT image by reducing or subtracting the extracted structural component in the first noise component CT image.

Hereinafter described will be the processes for extracting structural components from the noise component sinogram and the noise component CT image by the noise component acquisition unit 120 and the noise component CT image generation unit 130, respectively.

In order to extract the structural component, the noise component acquisition unit 120 and the noise component CT image generation unit 130 may extract the structural direction and signal coherence at each pixel, respectively. Herein, the structural direction may refer to the running direction of a structure, and the signal coherence may be an indicator of how clear the direction of a signal structure is.

According to an exemplary embodiment of the present disclosure, the structural direction may be a perpendicular direction of the normalized gradient vector, and the signal coherence may be determined based on the combination of an absolute gradient of the normalized gradient vector and an absolute gradient of the perpendicular vector to the normalized gradient vector. The absolute gradient may refer to the absolute value of a gradient (or gradient magnitude).

Figure 3A:
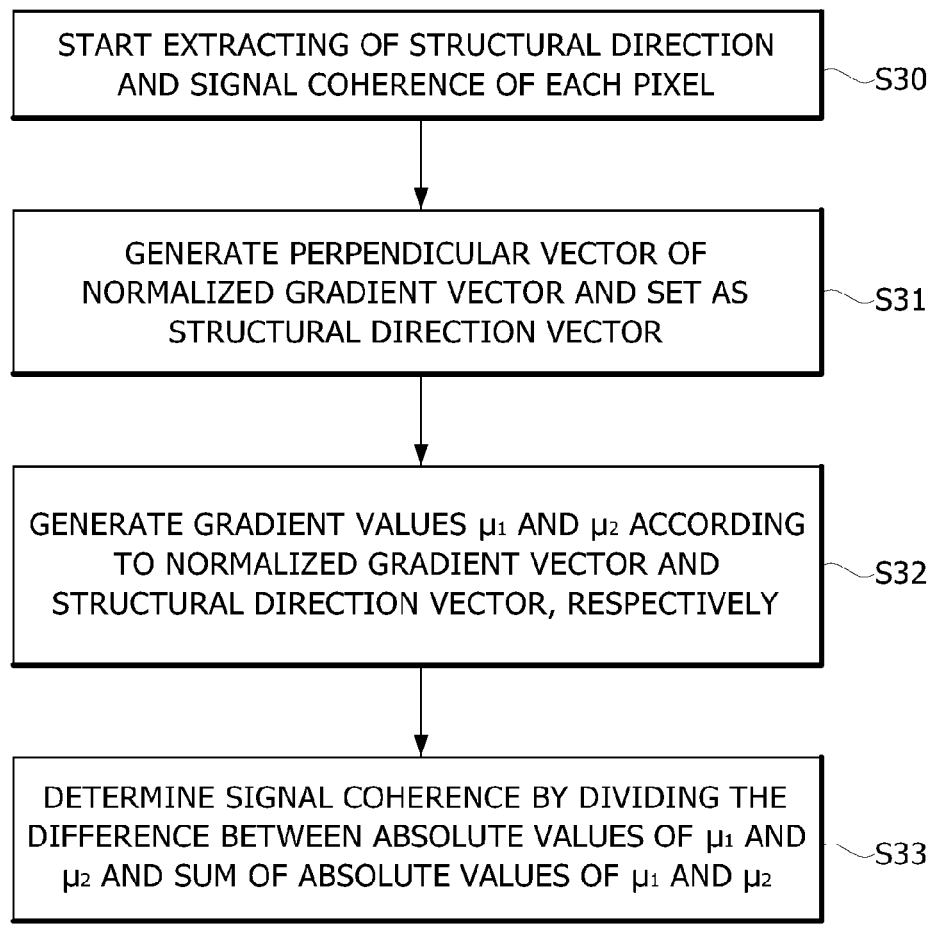
FIG. 3A to FIG. 3C are diagrams illustrating a method for extracting a structural direction and signal coherence of each pixel according to an exemplary embodiment of the present disclosure.
Figure 3B:
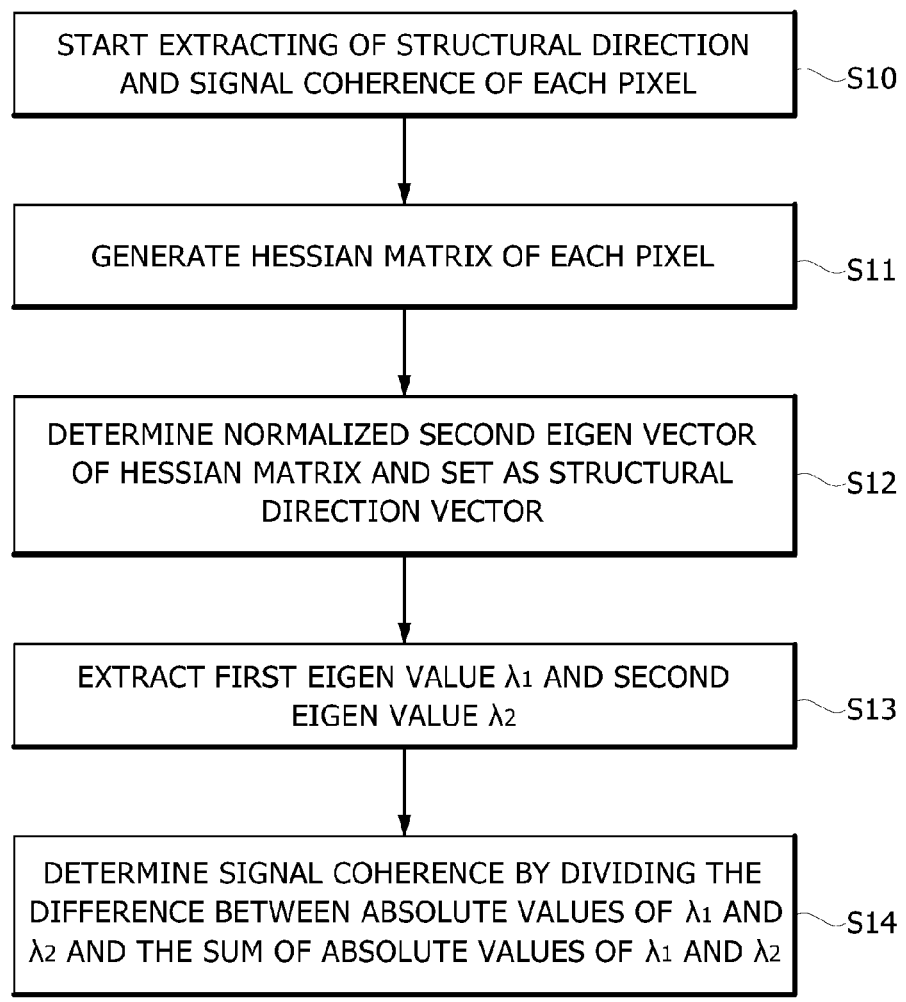

A method for extracting a structural direction and signal coherence of each pixel will be described with reference to FIG. 3A to FIG. 3C.

To be specific, the running direction vector Dg[x,y] of a structure may be obtained according to Equation 3 by obtaining a gradient vector G[x,y] at a given pixel location [x,y] according to Equation 1 followed by normalizing the gradient vector G[x,y] according to Equation 2 and obtaining a perpendicular direction thereof. Herein, signal coherence Cg[x,y] may be obtained from a combination of the signal gradient $\mu_1$ according to the normalized gradient vector and signal gradient $\mu_2$ according to the perpendicular direction thereof. A desirable example thereof is as shown in Equation 4 (see block S30 to block S33 in FIG. 3A).

$$G[x, y] = \begin{bmatrix} \frac{\Delta I[x, y]}{\Delta x} \\ \frac{\Delta I[x, y]}{\Delta y} \end{bmatrix} \quad \text{[Equation 1]}$$

$$G_n[x, y] = \frac{1}{|G[x, y]|} \begin{bmatrix} \frac{\Delta I[x, y]}{\Delta x} \\ \frac{\Delta I[x, y]}{\Delta y} \end{bmatrix} \quad \text{[Equation 2]}$$

$$D_g[x, y] = \frac{1}{|G[x, y]|} \begin{bmatrix} \frac{\Delta I[x, y]}{\Delta y} \\ \frac{-\Delta I[x, y]}{\Delta x} \end{bmatrix} \quad \text{[Equation 3]}$$

$$\mu_1 = I[x + D_g x, y + D_g y] - I[x, y]$$
$$\mu_2 = I[x + D_g y, y - D_g x] - I[x, y]$$

$$C_g[x, y] = \frac{|u_1| - |u_2|}{|u_1| + |u_2|} \quad \text{[Equation 4]}$$

According to another exemplary embodiment of the present disclosure, the structural direction may be one of eigen vectors in Hessian matrix of each pixel, and the signal coherence may be determined based on absolute eigen values in Hessian matrix. Hereafter, the absolute eigen value may refer to an absolute value of the eigen value.

To be specific, the structural direction Dh[x,y] may be determined as the second eigen vector V2 in the Hessian matrix H[x,y] as shown in Equation 5, and the signal coherence Ch [x,y] may be determined based on a combination of the first and second absolute eigen values. A desirable example thereof is as shown in Equation 6 (see block S10 to block S14 in FIG. 3B).

$$H[x, y] = \begin{bmatrix} \frac{\partial^2 I[x, y]}{\partial x \partial x} & \frac{\partial^2 I[x, y]}{\partial x \partial y} \\ \frac{\partial^2 I[x, y]}{\partial x \partial y} & \frac{\partial^2 I[x, y]}{\partial y \partial y} \end{bmatrix} \quad \text{[Equation 5]}$$

$$C_h[x, y] = \frac{|\lambda_1| - |\lambda_2|}{|\lambda_1| + |\lambda_2|} \quad \text{[Equation 6]}$$

Figure 3C:
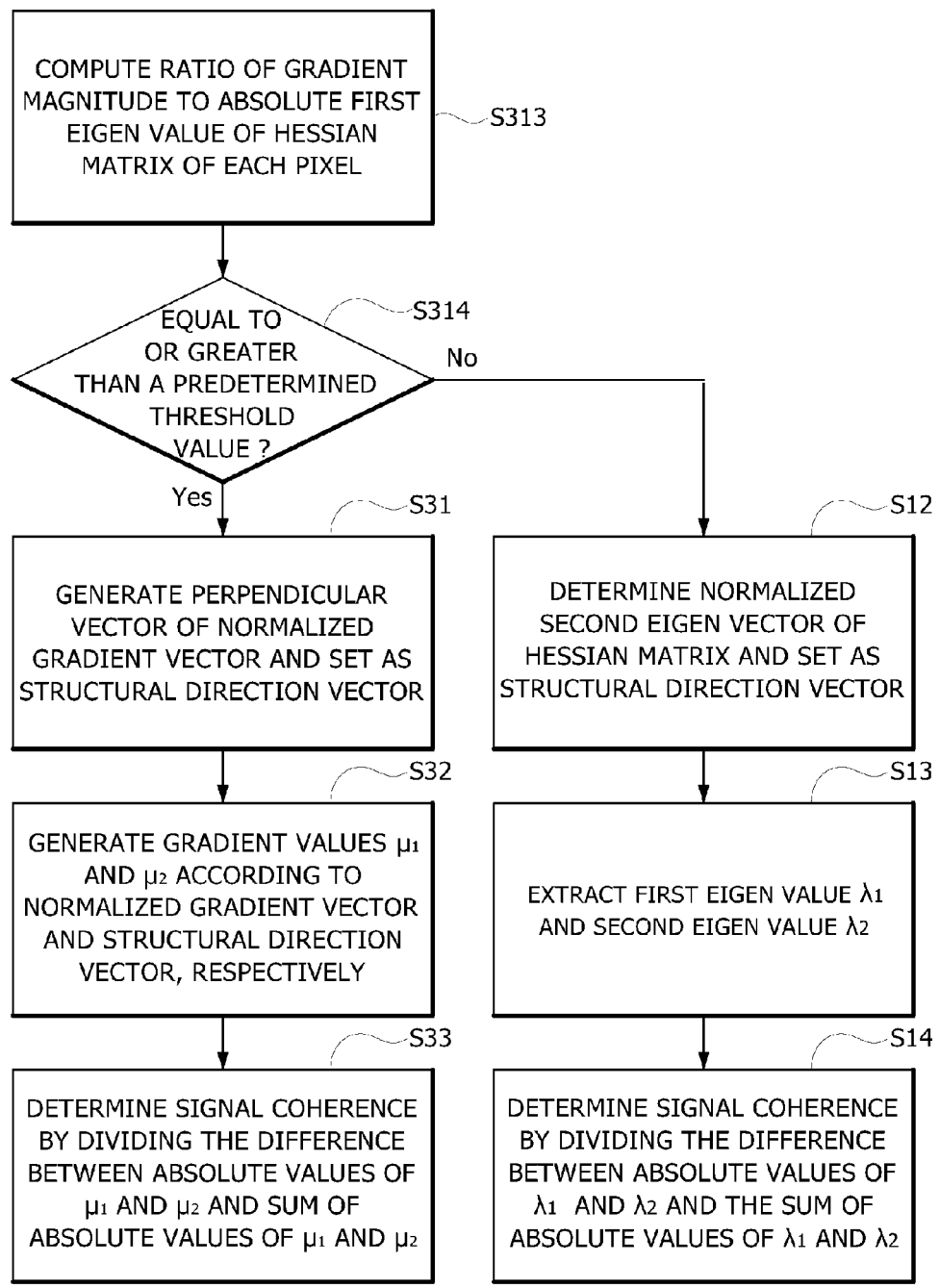

According to yet another exemplary embodiment of the present disclosure, the structural direction and the signal coherence may be determined based on the ratio of absolute gradient of the absolute first eigen value in Hessian matrix at each pixel as shown in FIG. 3C (S313).

Herein, if the ratio is greater than a predetermined reference value (S314), the structural direction may be determined as the perpendicular direction to the normalized gradient vector, and the signal coherence may be determined based on the combination of the absolute gradient value of the normalized gradient vector and the absolute gradient value of the perpendicular vector of the normalized gradient vector (see block S30 to block S33 in FIG. 3C).

Further, if the ratio is smaller than the predetermined reference value (S314), the structural direction may be determined as the second eigen vector in Hessian matrix, and the signal coherence may be determined based on a combination of two absolute eigen values in Hessian matrix (see block S11 to block S14 in FIG. 3C).

In other words, as shown in Equation 7, if the ratio of the absolute gradient value to the absolute first eigen value in Hessian matrix is greater than a predetermined reference value T, the structural direction may be determined as the perpendicular direction to the normalized gradient vector. Else, if the said ratio is smaller than or equal to the reference value T, the structural direction may be determined as the second eigen vector in Hessian matrix.

$$D_{g+h}[x, y] = \begin{bmatrix} D_g(x, y) & \text{if } \frac{|G(x, y)|}{\lambda_1} > T \\ D_h(x, y) & \text{else} \end{bmatrix} \quad \text{[Equation 7]}$$

Further, as shown in Equation 8, if the ratio of the absolute gradient to the absolute first eigen value in the Hessian matrix is greater than the predetermined reference value T, the signal coherence may be determined based on a combination of the absolute gradient corresponding to the normalized gradient vector and absolute gradient corresponding to the perpendicular vector of the normalized gradient vector. Else, If the said ratio is smaller than or equal to the predetermined reference value T, the signal coherence may be determined based on a combination of two absolute eigen values in Hessian matrix.

$$C_{g+h}[x, y] = \begin{bmatrix} C_g(x, y) & \text{if } \frac{|G(x, y)|}{\lambda_1} > T \\ C_h(x, y) & \text{else} \end{bmatrix} \quad \text{[Equation 8]}$$

Further, according to an exemplary embodiment of the present disclosure, the noise component acquisition unit 120 may obtain a structural direction and signal coherence depending on a kind of input image: the noise component acquisition unit 120 may obtain a structural direction and signal coherence from an image having no linear structure or an insignificant linear structure according to Equation 3 and Equation 4, the noise component acquisition unit 120 may obtain a structural direction and signal coherence from an image having a large number of linear structures according to Equation 5 and Equation 6, the noise component acquisition unit 120 may selectively obtain a structural direction and signal coherence from an image having a moderate number of linear structures according to Equation 7 and Equation 8.

The noise component acquisition unit 120 and the noise component CT image generation unit 130 may perform an anisotropic filtering to the noise component synthetic sinogram and the noise component CT image, respectively, based on the structural direction and the signal coherence. To be specific, the noise component acquisition unit 120 and the noise component CT image generation unit 130 may determine a filter kernel with a 2D anisotropic Gaussian function reflecting the structural direction and the signal coherence at each pixel, and perform filtering. Herein, the major axis length of 2D anisotropic Gaussian function may be a predetermined value, and the minor axis may be determined by multiplying the major axis length by a combination of the signal coherence and a predetermined proportional constant. The rotation angle of 2D anisotropic Gaussian function may be the structural direction. Further, the results of the anisotropic filtering may be the structural component of the noise component synthetic sinogram and the noise component CT image, respectively.

Figure 4:
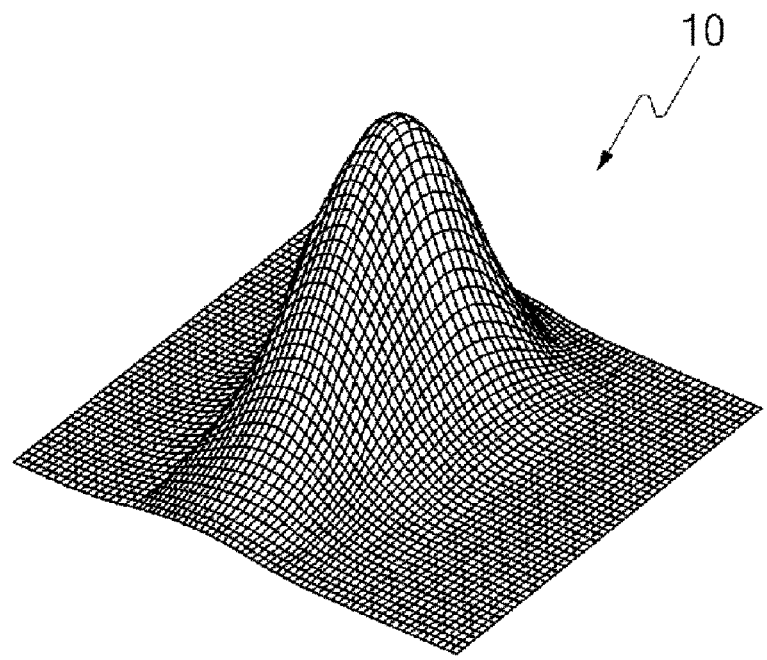
FIG. 4 is a diagram illustrating an example of an anisotropic 2D Gaussian kernel.

FIG. 4 illustrates an example of anisotropic Gaussian kernel.

Referring to Equation 9, the 2D anisotropic Gaussian function with the major and the minor axis lengths being σx and σy, respectively, and with the angle being θ may be represented with differing values of the major and minor axis and angle θ.

If the kernel size of an anisotropic filter is set to N, the major and minor axis lengths of the 2D anisotropic Gaussian function may be σx=N and σx=(1−C(x,y)) N, respectively, and the angle may be $$\theta = \tan\left(\frac{Dy}{Dx}\right).$$

As such, it is possible to generate a kernel in the form of a 2D anisotropic Gaussian function by using the direction and signal coherence at each pixel.

$$f(x,y)=Ae^{-(a(x-x_o)^2+2b(x-x_o)(y-y_o)+c(y-y_o)^2)} \quad \text{[Equation 9]}$$

Herein, $$a = \frac{\cos^2\theta}{2\sigma_x^2} + \frac{\sin^2\theta}{2\sigma_y^2},$$

$$b = -\frac{\sin 2\theta}{4\sigma_x^2} + \frac{\sin 2\theta}{4\sigma_y^2}, \text{ and}$$

$$c = \frac{\sin^2\theta}{2\sigma_x^2} + \frac{\cos^2\theta}{2\sigma_y^2}.$$

As described above, the noise component acquisition unit 120 and the noise component CT image generation unit 130 may extract structural component from the noise component synthetic sinogram and the noise component CT image, respectively by performing an anisotropic filtering based on the structural direction and signal coherence at each pixel.

Herein, it may be possible to generate a kernel for each pixel by computation, or may be possible to previously generate kernels corresponding to diverse structural directions and signal coherence in order to reduce computational complexity, and use an appropriate kernel according to the structural direction and signal coherence obtained at each signal.

The denoising unit 140 may reduce noise in the original CT image based on the noise component CT image generated by the noise component CT image generation unit 130. Herein, the denoising unit 140 may reduce noise in the original CT image with multiple methods.

According to an example, the denoising unit 140 may reduce noise in the original CT image by subtracting the noise component CT image from the original CT image pixel by pixel.

According to another example, the denoising unit 140 may extract tissue information (a range of previously known attenuation values for the tissue or organ of interest) from the original CT image and reduce noise in the original CT image based on the extracted tissue information. Herein, the denoising unit 140 may reduce noise in the original CT image by adaptively subtracting the noise component CT image from the original CT image based on the extracted tissue information. By way of example, the denoising unit 140 may lower the degree of noise reduction on a region corresponding to specific tissue.

According to another example, the denoising unit 140 may avoid deterioration in image quality by applying a predetermined rule for outlier pixels on the noise component CT image with pixel values beyond a predetermined range. By way of example, the denoising unit 140 may determine outlier pixels having pixel values beyond a threshold value determined by multiplying a predetermined constant by the standard deviation of all noise component pixels, or may determine those pixels with top 5% pixel values on the noise component CT image.

According to yet another example, the denoising unit 140 may extract a structural direction and signal coherence of each pixel in the original CT image and reduce noise in the original CT image based on the structural direction, signal coherence, and pixel value of the noise component CT image according to a predetermined rule.

In connection with the operation of the denoising unit 140, a process for extracting a structural direction and signal coherence of each pixel in the original CT image is performed in the same manner as the process for extracting a structural component by the noise component acquisition unit 120 and the noise component CT image generation unit 130. Therefore, explanation thereof will be omitted.

Figure 5:
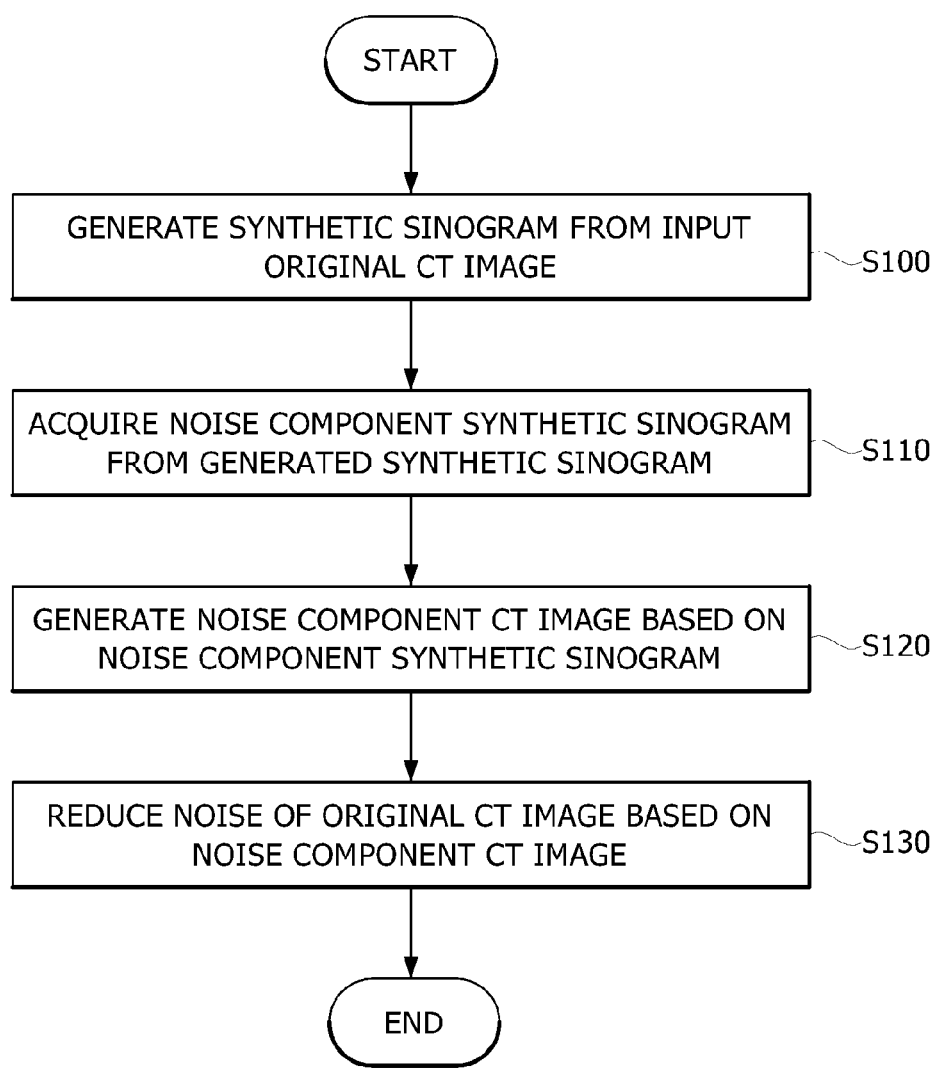
FIG. 5 is a flowchart of a denoising method according to an exemplary embodiment of the present disclosure.

FIG. 5 is a flowchart of a denoising method according to an exemplary embodiment of the present disclosure. The denoising method according to the exemplary embodiment illustrated in FIG. 5 includes steps time-sequentially performed in the denoising apparatus illustrated in FIG. 2. Therefore, although omitted from the following description, the descriptions relating to the denoising apparatus illustrated in FIG. 1 may also be applied to the denoising method according to the exemplary embodiment illustrated in FIGS. 3A to 3C.

In block S100, the synthetic sinogram generation unit 110 of the denoising apparatus 100 may generate a synthetic sinogram from an input original CT image.

Further, in block S100, the denoising method may further include determining an attenuation coefficient for each pixel in the original CT image, obtaining data on X-ray source to detector distance, and X-ray source to patient distance based on DICOM header of original CT image.

Further, in block S100, the denoising method may further include generating a synthetic sinogram based on the determined attenuation coefficient for each pixel along with CT geometry data such as X-ray source to detector distance and X-ray source to patient distance.

In block S100, the synthetic sinogram may be generated by performing a projection operation at each rotation angle based on the determined attenuation coefficient for each pixel along with CT geometry data such as X-ray source to detector distance and X-ray source to patient distance.

Meanwhile, if the synthetic sinogram is generated in block sS100 as described above, the noise component acquisition unit 120 of the denoising apparatus 100 may acquire a noise component synthetic sinogram from the generated synthetic sinogram (S120).

Figure 6:
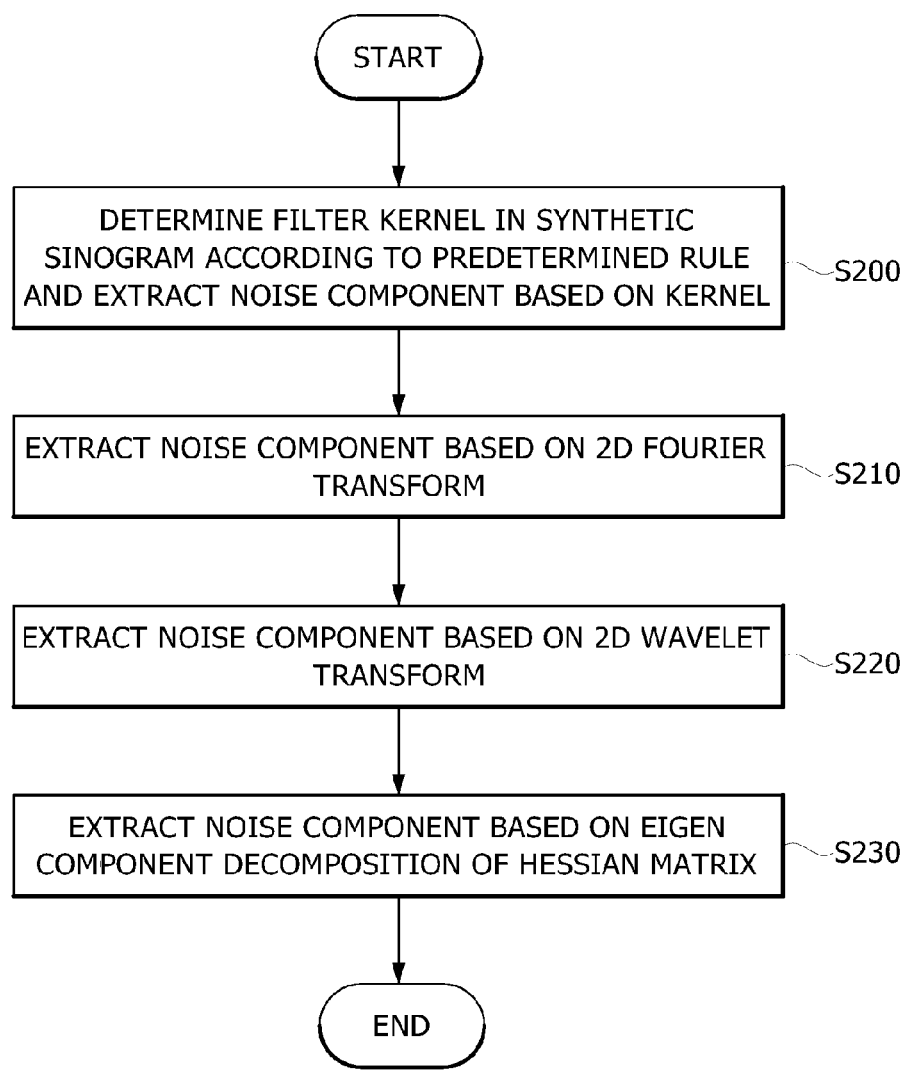
FIG. 6 is a diagram illustrating a process for acquiring a noise component synthetic sinogram according to an exemplary embodiment of the present disclosure.

FIG. 6 is a diagram illustrating a process for acquiring a noise component synthetic sinogram according to an exemplary embodiment of the present disclosure.

Further, in block S100, the denoising method may include: determining a filter kernel in the synthetic sinogram according to a predetermined rule followed by extracting a noise component based on the kernel (S200), extracting a noise component based on the 2D Fourier transform (S210), extracting a noise component based on the 2D Wavelet transform (S220), and extracting a noise component based on eigen decomposition of Hessian matrix (S230) at each pixel.

Meanwhile, if the noise component synthetic sinogram is acquired from the synthetic sinogram in block S110 as described above, the image generation unit 130 of the denoising apparatus 100 may generate a noise component CT image based on the (S130).

In block S130, the noise component CT image may be generated by applying the filtered back-projection operation to the noise component synthetic sinogram.

Further, in block S130, the denoising method may include: generating a first noise component CT image by applying the filtered back-projection operation to the noise component synthetic sinogram, extracting a structural component from the first noise component CT image, and generating a second noise component CT image from the first noise component CT image by reducing the extracted structural component from the first noise component CT image.

If the noise component CT image is generated in block S130, it is possible to reduce nose in the original CT image based on the noise component CT image (S140).

In block S140, the denoising method may include: extracting tissue information from the original CT image, and reducing noise in the original CT image based on the extracted tissue information and the noise component CT image.

Further, in block S140, it is possible to reduce noise in the original CT image by adaptively subtracting the noise component CT image from the original CT image based on the extracted tissue information.

Further, in block S140, it is possible to decrease the pixel value of the noise component CT image according to a predetermined rule based on a distribution ranking of the pixel value in the noise component CT image.

Figure 7:
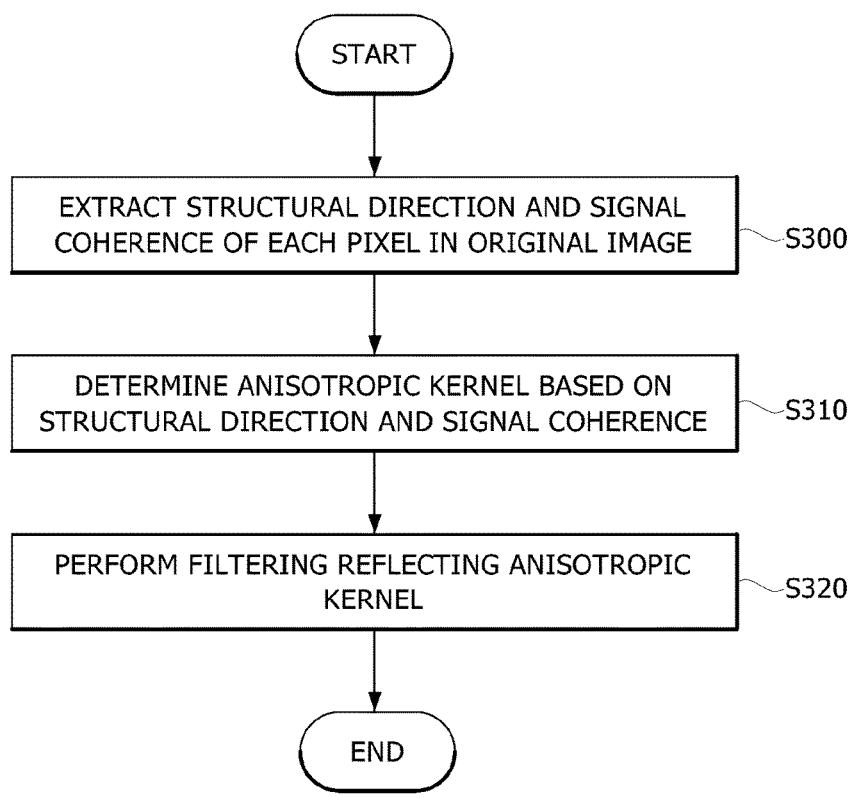
FIG. 7 is a diagram illustrating a process for extracting a structural component from the first noise component CT image according to an exemplary embodiment of the present disclosure.

FIG. 7 is a diagram illustrating the process for extracting a structural component according to an exemplary embodiment of the present disclosure.

In a process for extracting a structural component, a noise component may be extracted by using at least one of multiple methods. The multiple methods may include: a method of extracting a structural direction and signal coherence of each pixel in the original image (S300), a method of determining an anisotropic kernel based on the structural direction and signal coherence (S310), and a method of performing a filtering using the anisotropic kernel (S320). In the process for extracting a structural component, the noise component may be extracted by using at least one of the multiple methods or by using all of the methods.

Each of the above-described methods (for example, the method for denoising a CT image) can be embodied in a storage medium including instruction codes executable by a computer or processor such as a program module executed by the computer or processor. A data structure in accordance with the exemplary embodiments can be stored in the storage medium executable by the computer or processor. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as a computer-readable instruction code, a data structure, a program module or other data. The communication medium typically includes the computer-readable instruction code, the data structure, the program module, or other data of a modulated data signal such as a carrier wave, or other transmission mechanism, and includes information transmission mediums.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A method for denoising a CT image, comprising:
   generating a synthetic sinogram from an input original CT image;
   acquiring a noise component synthetic sinogram from the generated synthetic sinogram;
   generating a noise component CT image based on the noise component synthetic sinogram; and
   reducing noise in the original CT image based on the noise component CT image.

2. The method for denoising a CT image of claim 1,
   wherein the generating a synthetic sinogram includes:
   determining the attenuation coefficient of each pixel in the original CT image and obtaining CT geometry data such as X-ray source to detector distance and X-ray source to patient distance based on a DICOM header of the original CT image; and
   generating the synthetic sinogram based on the said determined attenuation coefficient of each pixel along with the CT geometry data such as X-ray source to detector distance and X-ray source to patient distance.

3. The method for denoising a CT image of claim 2,
   wherein the synthetic sinogram is generated by performing a projection operation at each rotation angle based on the said determined attenuation coefficient of each pixel along with the CT geometry data such as X-ray source to detector distance and X-ray source to patient distance.

4. The method for denoising a CT image of claim 1,
   wherein the acquiring a noise component synthetic sinogram includes:
   acquiring a first noise component synthetic sinogram by extracting a noise component from the synthetic sinogram;
   extracting a structural component from the first noise component synthetic sinogram; and
   generating a second noise component synthetic sinogram from the first noise component synthetic sinogram by subtracting the extracted structural component from the first noise component synthetic sinogram.

5. The method for denoising a CT image of claim 1, wherein the acquiring a noise component synthetic sinogram includes:
extracting a noise component using at least one of multiple methods,
wherein the multiple methods comprises:
a first method in which a filter kernel is determined in the synthetic sinogram according to a predetermined rule and a noise component is extracted based on the kernel;
a second method in which a noise component is extracted based on the 2D Fourier transform;
a third method in which a noise component is extracted based on the 2D Wavelet transform; and
a fourth method in which a noise component is extracted based on eigen decomposition of Hessian matrix at each pixel.

6. The method for denoising a CT image of claim 1, wherein the generating a noise component CT image includes:
generating a noise component CT image by applying the filtered back-projection operation to the noise component synthetic sinogram.

7. The method for denoising a CT image of claim 1, wherein the generating a noise component CT image includes:
generating a first noise component CT image by applying the filtered back-projection operation to the noise component synthetic sinogram;
extracting a structural component from the first noise component CT image; and
generating a second noise component CT image from the first noise component CT image by subtracting the extracted structural component from the first noise component CT image.

8. The method for denoising a CT image of claim 1, wherein the reducing noise in the original CT image includes:
extracting tissue information from the original CT image; and
reducing noise in the original CT image based on the extracted tissue information and the noise component CT image.

9. The method for denoising a CT image of claim 8, wherein the reducing noise in the original CT image includes:
reducing noise in the original CT image by adaptively subtracting the noise component CT image from the original CT image based on the extracted tissue information.

10. The method for denoising a CT image of claim 1, wherein the reducing noise in the original CT image includes:
decreasing the pixel value of the noise component CT image according to a predetermined rule based on a distribution ranking of the pixel value of the noise component CT image.

11. The method for denoising a CT image of claim 4, wherein the extracting a structural component includes:
extracting a structural direction and signal coherence at each pixel in the original image;
determining an anisotropic kernel based on the structural direction and the signal coherence at each pixel; and
performing image filtering with the determined anisotropic kernel at each pixel.

12. The method for denoising a CT image of claim 11, wherein the structural direction is a perpendicular direction to a normalized gradient vector, and
the signal coherence is determined based on an absolute gradient of the normalized gradient vector and an absolute gradient of a perpendicular vector of the normalized gradient vector.

13. The method for denoising a CT image of claim 11, wherein the structural direction is a second eigen vector in Hessian matrix of each pixel, and
the signal coherence is determined based on two absolute eigen values in Hessian matrix of each pixel.

14. The method for denoising a CT image of claim 11, wherein the structural direction and the signal coherence are determined based on the ratio of an absolute gradient to an absolute first eigen value in Hessian matrix, and
when the ratio is greater than a predetermined reference value, the structural direction is a perpendicular vector of the normalized gradient vector and the signal coherence is determined based on an absolute gradient of the normalized gradient vector and an absolute gradient of the perpendicular vector of the normalized gradient vector, and
when the ratio is smaller than the predetermined reference value, the structural direction is a second eigen vector in Hessian matrix and the signal coherence is determined based on the combination of two absolute eigen values in the Hessian matrix.

15. The method for denoising a CT image of claim 11, wherein the determining an anisotropic kernel based on the structural direction and the signal coherence includes: determining the kernel based on a 2D anisotropic Gaussian function with the major axis length of the 2D anisotropic Gaussian function being a predetermined value, the minor axis length being determined by multiplying the major axis length by the combination of the signal coherence and a predetermined proportional constant, and the rotation angle of the 2D anisotropic Gaussian function being the structural direction.

16. An apparatus for denoising a CT image, comprising:
a synthetic sinogram generation unit configured to generate a synthetic sinogram from an input original CT image;
a noise component acquisition unit configured to acquire a noise component synthetic sinogram from the generated synthetic sinogram;
a noise component CT image generation unit configured to generate a noise component CT image based on the noise component synthetic sinogram; and
a denoising unit configured to reduce noise in the original CT image based on the noise component CT image.

17. The apparatus for denoising a CT image of claim 16, wherein the noise component acquisition unit acquires the noise component synthetic sinogram by extracting a noise component from the synthetic sinogram.

18. The apparatus for denoising a CT image of claim 16, wherein the noise component CT image generation unit generates the noise component CT image by applying the filtered back-projection operation to the noise component synthetic sinogram generated by the noise component acquisition unit.

19. The apparatus for denoising a CT image of claim 16, wherein the noise component acquisition unit and the noise component CT image generation unit extract a structural component from the noise component sinogram and the noise component CT image, respectively, and subtracts the extracted structural component from the noise component sinogram and the noise component CT image, respectively.

20. The apparatus for denoising a CT image of claim 16, wherein the denoising unit extracts tissue information from the original CT image and reduces noise in the original CT image based on the extracted tissue information.

* * * * *